Sept. 17, 1929.    T. LANNIE    1,728,865
SLICING MACHINE
Filed Aug. 9, 1926    2 Sheets-Sheet 1

Thomas Lannie
INVENTOR

BY Victor J. Evans
ATTORNEY

WITNESS:

Sept. 17, 1929.  T. LANNIE  1,728,865
SLICING MACHINE
Filed Aug. 9, 1926  2 Sheets-Sheet 2

Thomas Lannie
INVENTOR

BY *Victor J. Evans*
ATTORNEY

*L. B. James*
WITNESS:

Patented Sept. 17, 1929

1,728,865

UNITED STATES PATENT OFFICE

THOMAS LANNIE, OF DETROIT, MICHIGAN

SLICING MACHINE

Application filed August 9, 1926. Serial No. 128,221.

An object of this invention is the provision of a machine for compressing and slicing ice cream into blocks or other desired forms.

A further object is the provision of a machine for this purpose which is simply constructed, which is easily operated, and which will perform its functions with precision and with accuracy.

To the attainment of the foregoing objects and others which will present themselves as the nature of the invention is better understood, the improvement further resides in certain novel features of construction, combination and operative association of parts, a satisfactory embodiment of which is disclosed by the accompanying drawings.

Figure 1:
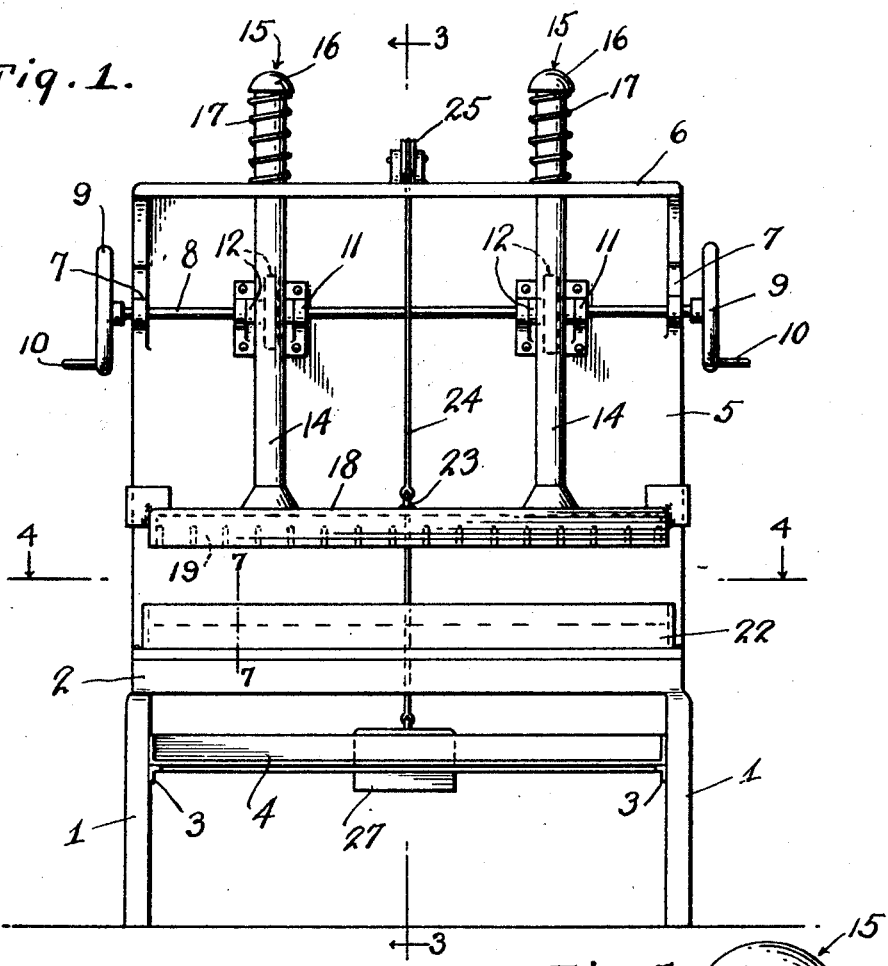
Figure 1 is a front elevation of a machine in accordance with this invention.
Figure 4:
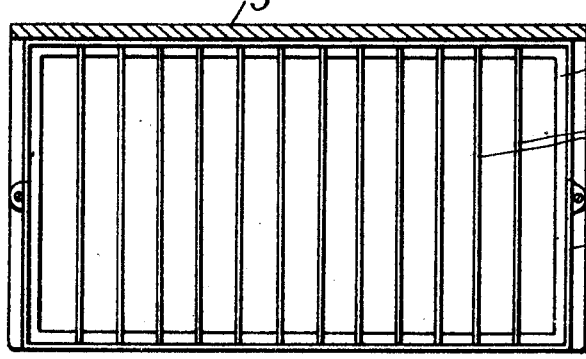
Figure 4 is a sectional view on the line 4—4 of Figure 1.
Figure 5:
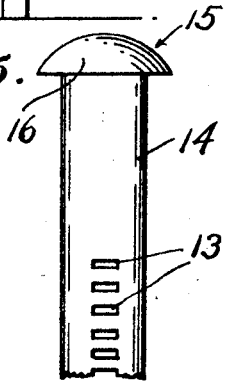
Figure 5 is a fragmentary sectional view of one of the rack bars employed.
Figure 2:
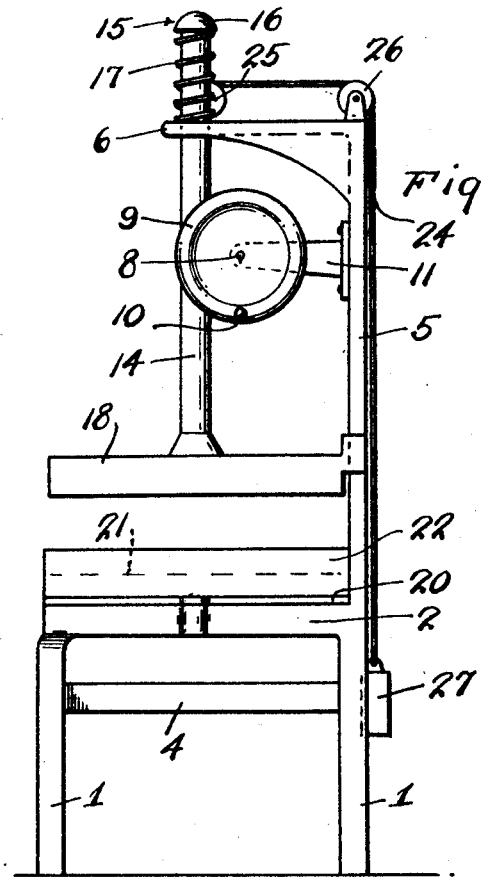
Figure 2 is a side elevation thereof.
Figure 3:
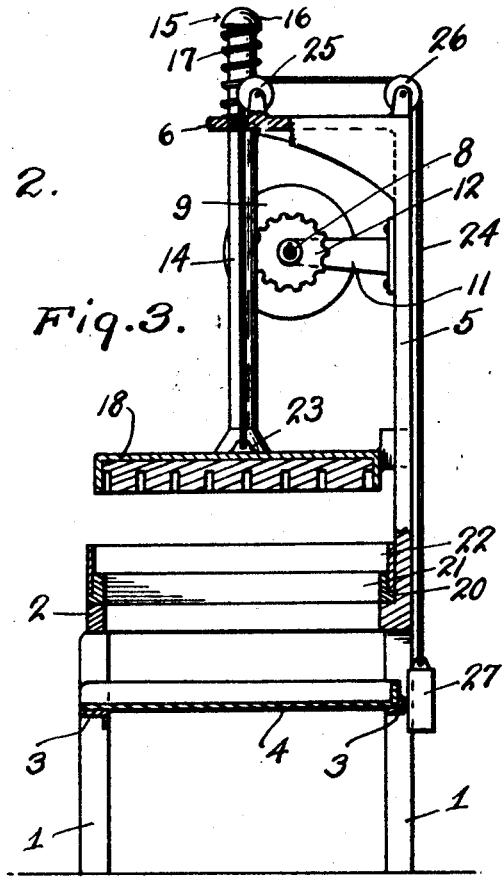
Figure 3 is a sectional view on the line 3—3 of Figure 1.
Figure 6:
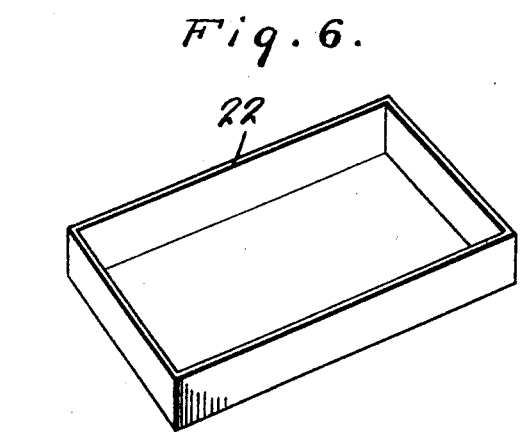
Figure 6 is a perspective view of the outer frame member.
Figure 7:
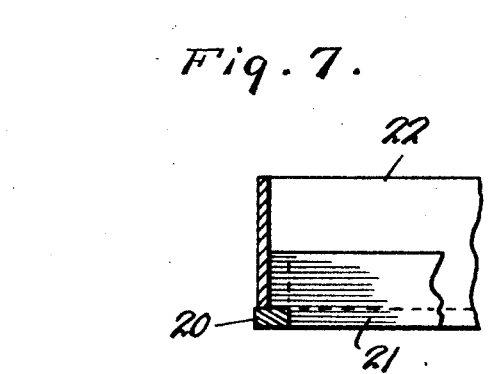
Figure 7 is a detail sectional view approximately on the line 7—7 of Figure 1.

Supported on corner legs 1 there is a substantially rectangular bed 2. The legs, below the bed have transverse cleats 3 upon which are designed to rest a pan 4. The rear wall provided by the bed is extended to provide the vertically disposed back plate 5 of the machine, and this plate is formed at its top with a ledge 6 that overlies the bed 2. Suitably integrally formed ribs or brackets are arranged between the outer edges of the ledge 6 and the back 5, and below these ledges there are either integrally formed or secured to the back outwardly directed bearing brackets 7 having openings in the outer ends thereof that provide bearings for a shaft 8. In the showing of the drawings, the shaft has on both of its ends wheels 9 provided with handle portions 10 whereby the shaft may be revolved manually. If desired, however, the shaft may be operated by suitable machinery.

In addition to the brackets 7 there are secured to the back other spaced bearing brackets 11 for the shaft 8, and fixed on the shaft 8, and disposed between the said pairs of spaced brackets 11 there are cog wheels 12. These cog wheels are in mesh with rack surfaces 13 on vertically disposed rods 14, the upper portions of which being journaled through bearing openings in the ledge 6. The outer ends of the rods 14 are headed, as at 15 in a manner to provide shoulders, and surrounding the rods and exerting a tension against the shoulders formed by the heads 16, and upper face of the ledge 6 there are coil springs 17. The rods have their lower ends fixedly secured to a flanged plate 18. The plate is in the nature of a compressor and between the flanges thereof the same is grooved to provide spaced blocks 19. The blocks may be shaped to provide cubes or any other desired forms and the said blocks may likewise have stenciled thereon suitable data relative to the manufacturer of the ice cream or the purveyor thereof. The plate 18 is formed with ears at the rear corners thereof and these ears engage the back plate for slidable movement thereon to guide the compressor in its movement.

Designed to be removably received on the bed 2 there is a substantially rectangular frame 20. The frame 20 forms the lower element of a form, the said frame having removably secured therein cutter blades or plates 21, and these plates or blades are so spaced as to receive the blocks 19 of the compressor plate 18 therebetween, so that ice cream delivered onto the form will be directed therethrough on the downward movement of the compressor plate 18 and the blocks forced through the form will drop onto the pan 4. Arranged to surround the frame of the form there is a second and removable frame 22, the said frame 22 being of a materially greater height than that of the frame 20.

Secured to an eye 23 in the center of the compressor plate 18 there is a flexible element 24 which is guided through a suitable opening in the center of the ledge 6 and over guide pulleys or sheave wheels 25 and 26 secured on the top of the ledge. To the free end of the element 24 there is connected a weight 27 for counter balancing the plate 18.

Ice cream frozen to a determined degree is placed in the receiving frame 22 over the form, the shaft 8 being revolved so as to raise the compressor plate 18. Thereafter the shaft is turned in a second direction so that the compressor plate is moved into the receiving frame 22 and the blocks thereof are moved between the plate or blades 21 in the form, and as previously stated, the compressed cream will be forced in blocks or other desired shape through the form onto the pan 4. After the sliced cream has been removed from the pan the operation is repeated.

The simplicity of my construction and the advantages thereof will, it is thought, be perfectly apparent to those skilled in the art to which such invention relates, when the foregoing description has been carefully read in connection with the accompanying drawings, it being, of course, understood that I do not wish to be limited to the precise details of construction herein set forth and therefore hold myself entitled to make such changes therefrom as fairly fall within the scope of what I claim.

The blades of the improvement may be ordinary hack-saw blades and may be readily replaced should the same become broken. The improvement it will be noted insures economy, speed and reliability in operation.

Having described the invention, I claim:—

A confection slicing machine comprising a leg supported bed, a back plate formed with the rear edge of the bed and rising therefrom, a ledge formed with the upper edge of the back plate and overlying the bed, compressor means, ears formed with the rear corners of said compressor means for sliding engagement with the opposite side edges of the back plate, rods secured to the compressor means and passing through the ledge for slidable movement, heads formed on the top of the rods in a manner to provide shoulders, coil springs surrounding the upper end portions of the rods and engaging the ledge and shoulders of the heads respectively to yieldably resist downward movement of the compressor, means for raising the compressor and supported upon the ledge, means carried by the back plate and engaging the rods to force the compressor downwardly, said last mentioned means including a shaft journaled in bearing brackets on the side edges of the back plate and intermediate the edges respectively, a shaft journaled in the bearing brackets, wheels on the ends of said shaft, cog wheels fixed to said shaft, said rods having ratchet means receiving the cog wheels, and cooperating cutting and molding means carried by the compressor and bed respectively.

In testimony whereof I affix my signature.

THOMAS LANNIE.